(12) United States Patent
Milford

(10) Patent No.: US 11,970,932 B2
(45) Date of Patent: Apr. 30, 2024

(54) MULTI-WELL IMAGE REFERENCE MAGNETIC RANGING AND INTERCEPTION

(71) Applicant: Halliburton Energy Services, Inc., Houston, TX (US)

(72) Inventor: Tyler Milford, Nisku (CA)

(73) Assignee: Halliburton Energy Services, Inc., Houston, TX (US)

( * ) Notice: Subject to any disclaimer, the term of this patent is extended or adjusted under 35 U.S.C. 154(b) by 37 days.

(21) Appl. No.: 17/888,111

(22) Filed: Aug. 15, 2022

(65) Prior Publication Data

US 2023/0151728 A1     May 18, 2023

Related U.S. Application Data

(60) Provisional application No. 63/279,831, filed on Nov. 16, 2021.

(51) Int. Cl.

| | |
|---|---|
| *E21B 47/02* | (2006.01) |
| *E21B 7/04* | (2006.01) |
| *E21B 47/002* | (2012.01) |
| *E21B 47/0228* | (2012.01) |
| *E21B 47/024* | (2006.01) |
| *G01V 3/26* | (2006.01) |

(52) U.S. Cl.
CPC ............ *E21B 47/0228* (2020.05); *E21B 7/04* (2013.01); *E21B 47/0025* (2020.05); *E21B 47/024* (2013.01); *G01V 3/26* (2013.01)

(58) Field of Classification Search
None
See application file for complete search history.

(56) References Cited

U.S. PATENT DOCUMENTS

| | | | |
|---|---|---|---|
| 5,074,365 A | 12/1991 | Kuckes | |
| 8,322,462 B2 | 12/2012 | Kuckes | |
| 11,119,240 B2 | 9/2021 | Milford et al. | |
| 2010/0040259 A1* | 2/2010 | Morris | G01V 11/00 |
| | | | 382/109 |
| 2016/0041296 A1* | 2/2016 | Ahmad | G01V 3/38 |
| | | | 324/346 |
| 2016/0273339 A1* | 9/2016 | Wu | E21B 47/12 |
| 2017/0176628 A1* | 6/2017 | Paulsen | G01V 3/32 |
| 2017/0211374 A1 | 7/2017 | Hess et al. | |
| 2018/0329105 A1* | 11/2018 | Capoglu | G01V 3/38 |
| 2019/0113650 A1* | 4/2019 | Guner | G01V 3/38 |
| 2020/0190966 A1* | 6/2020 | Donderici | E21B 47/13 |
| 2020/0265615 A1* | 8/2020 | Di Santo | E21B 49/00 |

OTHER PUBLICATIONS

International Search Report and Written Opinion for PCT Application No. PCT/US2022/042336 dated Dec. 9, 2022.

\* cited by examiner

*Primary Examiner* — Alvaro E Fortich
(74) *Attorney, Agent, or Firm* — Benjamin Ford; C. Tumey Law Group PLLC

(57) ABSTRACT

A method for ranging to locate a target borehole. The method may include disposing a bottom hole assembly (BHA) into an intercept borehole, disposing a downhole tool into a reference borehole, imaging a target borehole for the intercept borehole to get a first set of measurement, imaging the target borehole from the reference borehole to get a second set of measurements, and combining the first set of measurements and the second set of measurements to determine a direction and distance to the target borehole form the intercept borehole.

20 Claims, 3 Drawing Sheets

MULTI-WELL IMAGE REFERENCE MAGNETIC RANGING AND INTERCEPTION

BACKGROUND

Borehole drilled into subterranean formations may enable recovery of desirable fluids (e.g., hydrocarbons) using any number of different techniques. When developing and drilling boreholes, it is important to be able to position the active borehole where desired proximate the surrounding geology of the subterranean formation and proximate adjacent boreholes. As drilling operations progress, the borehole position may change over time relative to adjacent boreholes.

During drilling operations, a borehole may become obstructed, which may prevent further drilling operations and/or recovery operations. The obstruction may be so severe an interception operation may be required. The interception operation may require a second drilling operation to intercept the obstructed borehole. Interception operations are difficult in that there may not be metal within the borehole for which a resistivity assembly may be used to identify where the borehole is in a formation. Currently, there is no proven interception method of borehole (i.e., open hole wellbores) that have significant nonconductive obstructions between the desired intercept point and the last set casing shoe.

BRIEF DESCRIPTION OF THE DRAWINGS

These drawings illustrate certain aspects of some examples of the present disclosure and should not be used to limit or define the disclosure.

DETAILED DESCRIPTION

As discussed below, systems and methods for operations in which a magnetic ranging operations, alone, may not be able to identify and intercept a borehole. The systems and methods described below may be utilized in a relief well scenario, complex plug and abandonment or high-risk collision avoidance. By utilizing imaging tool and ranging tools from multiple boreholes, an accurate layout of borehole configuration and tool location may be found.

Figure 1:
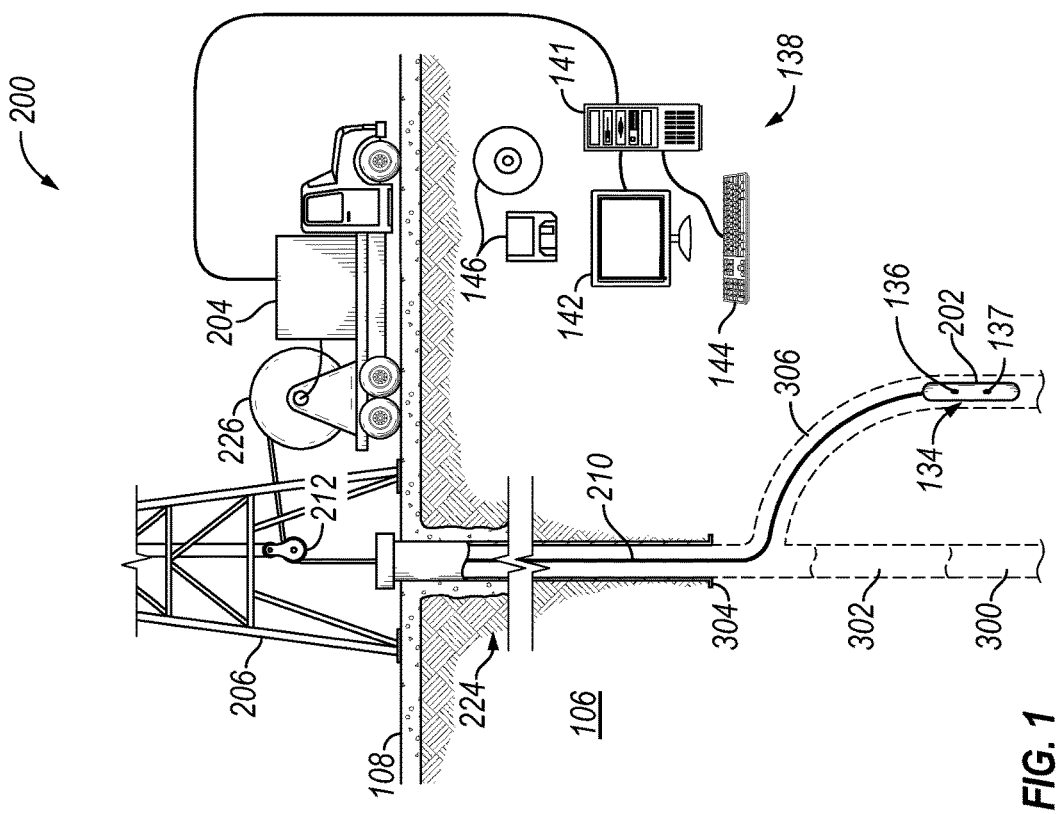
FIG. 1 illustrates an example of an interception operation.
Figure 1:
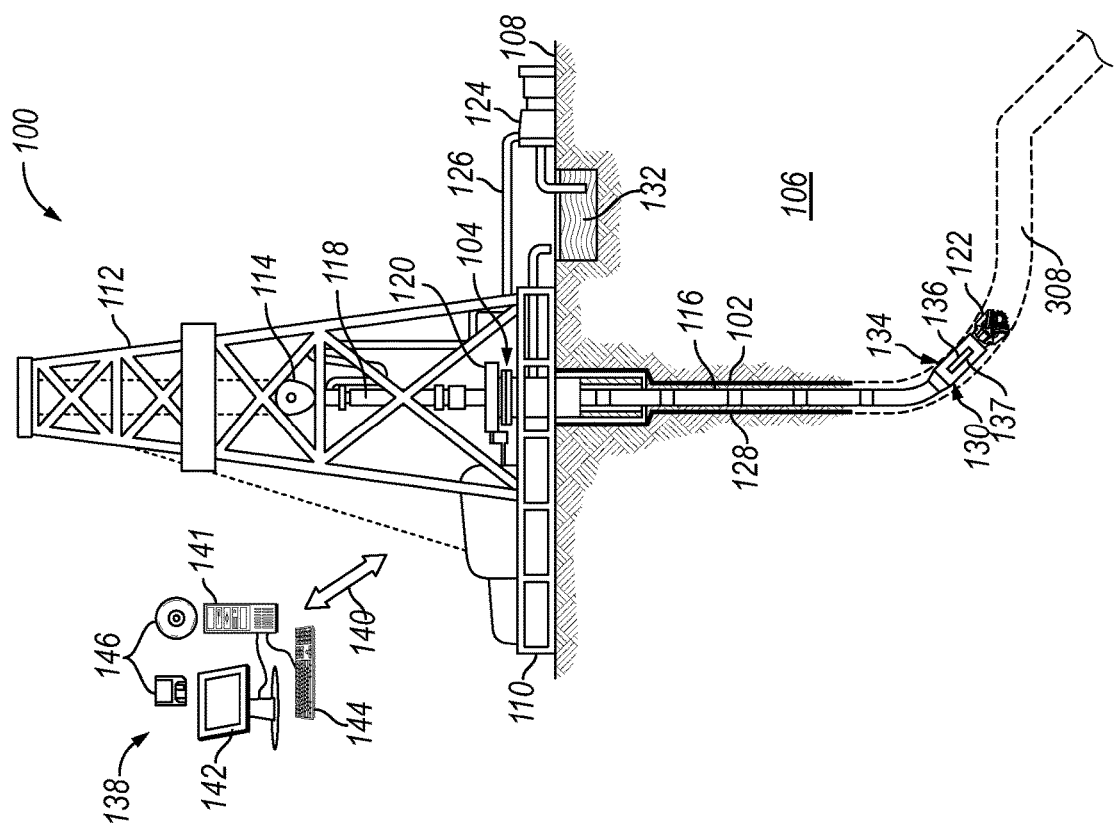

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depict land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly (BHA) 130 at distal end of drill string 116. BHA 130 may further include tools for look-ahead resistivity applications. As will be appreciated by those of ordinary skill in the art, BHA 130 may be a measurement-while drilling (MWD) or logging-while-drilling (LWD) system.

BHA 130 may comprise any number of tools, transmitters, and/or receivers to perform downhole measurement operations. For example, as illustrated in FIG. 1, BHA 130 may include an imaging assembly 134. It should be noted that imaging assembly 134 may make up at least a part of BHA 130. Without limitation, any number of different measurement assemblies, communication assemblies, battery assemblies, and/or the like may form BHA 130 with imaging assembly 134. Additionally, imaging assembly 134 may form BHA 130 itself. In examples, imaging assembly 134 may comprise at least one transmitter 136 and at least one receiver 137. In some examples, transmitter 136 and receivers 137 may include loop antennae/coils that may be tilted/disposed at an angle (e.g., 45 degrees) relative to a longitudinal axis (e.g., z axis) of imaging assembly 134. In some examples, receivers 137 may be collocated (e.g., intersecting loops), However, it should be noted that there may be any number of transmitters 136 and receivers 137 disposed along BHA 130 at any degree from each other. Additionally, transmitters 136 and receivers 137 may be aligned on top of each other and spaced about the axis of BHA 130.

Without limitation, BHA 130 and all parts within BHA 130 (i.e., transmitters 136 and receivers 137) may be connected to and/or controlled by information handling system 138, which may be disposed on surface 108. Without limitation, information handling system 138 may be disposed downhole in BHA 130. Processing of information recorded may occur downhole and/or on surface 108. Processing occurring downhole may be transmitted to surface 108 to be recorded, observed, and/or further analyzed. Additionally, information recorded on information handling system 138 that may be disposed downhole may be stored until BHA 130 may be brought to surface 108. In examples, information handling system 138 may communicate with BHA 130 through a communication line (not illustrated) disposed in (or on) drill string 116. In examples, wireless communication may be used to transmit information back and forth between information handling system 138 and BHA 130. Information handling system 138 may transmit information to BHA 130 and may receive as well as process information recorded by BHA 130. In examples, a downhole information handling system (not illustrated) may include, without limitation, a microprocessor or other suitable circuitry, for estimating, receiving and processing signals from BHA 130. Downhole information handling system (not illustrated) may further include additional components, such as memory, input/output devices, interfaces, and the like. In examples, while not illustrated, BHA 130 may include one or more additional components, such as analog-to-digital converter, filter and amplifier, among others, which may be used to process the measurements of BHA 130 before they may be transmitted to surface 108. Alternatively, raw measurements from BHA 130 may be transmitted to surface 108.

Any suitable technique may be used for transmitting signals from BHA 130 to surface 108, including, but not limited to, wired pipe telemetry, mud-pulse telemetry, acoustic telemetry, and electromagnetic telemetry. While not illustrated, BHA 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from BHA 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into a two or three-dimensional models of subterranean formation 106. These models may be used for well planning, (e.g., to design a path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from BHA 130 of the formation properties may be used to steer drilling system 100 toward a subterranean formation 106.

FIG. 1 illustrates a cross-sectional view of a well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by receiver 148 may be stored on memory and then processed by downhole tool 202.

The processing may be performed real-time during data acquisition or after recovery of downhole tool 202. For this disclosure, real-time is a duration of time ranging from about a second to about ten minutes. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from wellbore 102. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of wellbore 102. Information handling system 138 may comprise a safety valve (not illustrated) which controls the hydraulic pressure that drives drum 226 on vehicle 204 which may reel up and/or release conveyance 210 which may move downhole tool 202 up and/or down wellbore 102. The safety valve may be adjusted to a pressure such that drum 226 may only impart a small amount of tension to conveyance 210 over and above the tension necessary to retrieve conveyance 210 and/or downhole tool 202 from wellbore 102. The safety valve is typically set a few hundred pounds above the amount of safe pull on conveyance 210 such that once that limit is exceeded, further pull on conveyance 210 may be prevented.

As illustrated in FIG. 1, downhole tool 202 may include imaging assembly 134. It should be noted that imaging assembly 134 may make up at least a part of downhole tool 202. Without limitation, any number of different measurement assemblies, communication assemblies, battery assemblies, and/or the like may form downhole tool 202 with imaging assembly 134. Additionally, imaging assembly 134 may form downhole tool 202 itself. In examples, imaging assembly 134 may comprise at least one transmitter 136 and at least one receiver 137. As noted above, transmitters 136 and receivers 137 may be transducers. Additionally, the transmitters 136 and receivers 137 may operate, function, and be disposed according to the systems and methods described above and/or below.

With continued Reference to FIG. 1, FIG. 1 illustrates an interception operation in which drilling system 100 may operate to in conjunction with well measurement system 200 to identify target borehole 300. Interception operations may be utilized when an obstruction 302 has entered target borehole 300 below casing shoe 304 of wellbore 224. As illustrated, a reference borehole 306 may be drilled above obstruction 302. In examples, if reference borehole 306 may not be formed from wellbore 224, then reference borehole 306 may be formed using drilling operations discussed above to form wellbore 224. This may be formed in place of reference borehole 306. Downhole tool 202 with imaging assembly 134 may be lowered into reference borehole 306 to work in conjunction with BHA 130, as drilling operations 100 operate to form an intercept borehole 308. In examples, intercept borehole 308 may be formed, using drilling operations described above, to penetrate target borehole 300 below obstruction 302.

Figure 2:
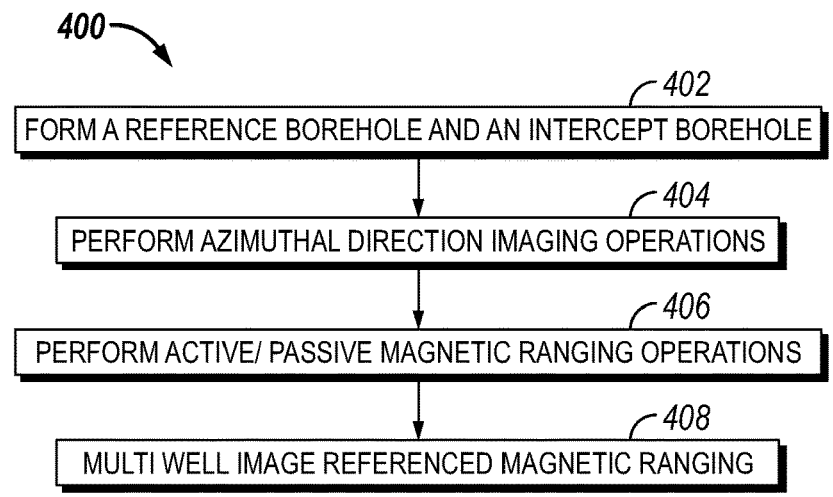
FIG. 2 is a workflow to determine the location of a target borehole.

FIG. 2 illustrates workflow 400 that determines the location of target borehole 300. Workflow 400 may begin with block 402 in which a reference borehole 306 and an intercept borehole 308 may be formed in view of the methods described above. Once reference borehole 306 and intercept borehole 308 have been formed, downhole tool 202 and BHA 130 may perform measurement operations, utilizing individual imaging assemblies 134 disposed on downhole tool 202 and BHA 130.

In block 404, azimuthal direction imaging operations may be performed. Imaging operations may comprise imaging target borehole 300 from reference borehole 306 and/or intercept borehole 308. It should be noted that imaging assemblies 134, disposed on both bottom hole assembly 130 and/or downhole tool 202 (e.g., referring to FIG. 1) may be any suitable imaging tool such as a resistivity tool, sonic tool, and/or the like. Additionally, each imaging assembly 134 may be different than their counterparts on different downhole equipment. Using any azimuthal imaging tool (Resistivity, Sonic, etc.), an image of target borehole 300 may be taken from reference borehole 306, using downhole tool 202. Generally, imaging assembly 134 may provide a reliable directional reference for finding wellbores but deriving an accurate relative distance has eluded the industry to date during practical applications. The image formed form imaging operations may be utilized with ranging measurements. At the end of imaging operations, imaging tools disposed on bottom hole assembly 130 and/or downhole tool 202 may be removed. However, both bottom hole assembly 130 and/or downhole tool 202 may further comprise ranging tools.

In block 406, active and/or passive ranging operations may be performed using ranging tools disposed on bottom hole assembly 130 and/or downhole tool 202 (e.g., referring to FIG. 1). In examples, these ranging tools may be disposed downhole after removing imaging tools. In other examples, as noted above, ranging tool and imaging tools may both be disposed on bottom hole assembly 130 and/or downhole tool 202 so that both bottom hole assembly 130 and/or downhole tool 202 may not need to be removed from target borehole 300, reference borehole 306, and/or intercept borehole 308. Ranging operations may comprise ranging between reference borehole 306 and intercept borehole 308 to identify distance and direction between two locations. Ranging operations may be performed by downhole tool 202 and/or bottom hole assembly 130 (e.g., referring to FIG. 1). In examples, downhole tool 202 and/o bottom hole assembly 130 may comprise a ranging tool. As ranging operations are generally electromechanical in nature, ranging may not be performed from reference borehole 306 to target borehole 300 and intercept borehole 308 to target borehole 300. This is due to the lack of metallic material in target borehole 300 that may be utilized in electromagnetic ranging. Direction may be identified by utilizing an azimuthal measurement tool. From intercept borehole 308 to reference borehole 306, magnetically ranging (active or passive) may be utilized to identify a distance and direction from intercept borehole 308 to reference borehole 306. In examples, electromechanical ranging may be replaced with acoustic ranging and/or resistivity ranging.

Acoustic ranging, in general, may comprise inserting into a wellbore 102 and/or borehole (such as target borehole 300 and/or reference borehole 306) a downhole tool 202 (e.g., referring to FIG. 1) with acoustic transmitters and receivers (not illustrated) and inducing an acoustic wave to travel into the walls of wellbore 102 and/or borehole and surrounding formation 106 (e.g., referring to FIG. 1). Acoustic sensing may provide continuous in situ measurements of parameters related to formation or borehole fluid. Additionally, acoustic sensing may provide information similar to a seismic survey whereby acoustic reflections from within formation 106 may be received and measured for (among other quantities) direction and distance from the tool. In examples, downhole tool 202 may operate on a conveyance and may be configured for acoustic ranging, resistivity ranging, and/or electromagnetic ranging. Acoustic logging tool may include an independent power supply and may store the acquired data on memory or transfer data in near real-time to a surface storage or processing unit.

Additionally, downhole tool 202 may be used to emit an acoustic signal that travels into formation 106 to provide data about impedance changes that reflect acoustic waves back to the tool. The transmitters may produce monopole, dipole, quadrupole, and other acoustic excitation modes that radiate into the formation. The receivers record direct as well as formation-reflected acoustic waves during a recording interval. Downhole tool 202 or a separately connected tool records the acoustic tool's orientation during each acoustic emission and recording. A Formation velocity model may be derived independently or from the acoustic receiver data, the orientation data, and the receiver recordings may be combined and processed to measure (among other quantities) reflector direction and distance. Reflector targets include any targets capable of reflecting acoustic energy back to the tool, including faults, bedding, fractures, vugs, and other boreholes.

In block 408, images from 404 and magnetic ranging measurements from block 406 may be utilized in a Multi Well Image Referenced Magnetic Ranging may be instituted to determine distance and direction between each borehole 300, 306, and 308. This method may use scale factors derived from the images relative to one another, a triangulated position of target borehole 300 based off of the images, which are all referenced back to the relative position of intercept borehole 308 and reference borehole 306 when the Magnetic Ranging operation was performed. Generally, magnetic ranging may be used to solve the relative distance and direction between intercept borehole 308 and reference borehole(s) 306 (e.g., referring to FIG. 3, discussed below). Downhole tools 202, such as the imaging tools described above, may provide a direction to the target borehole 300 (e.g., referring to FIG. 3, discussed below). Using the distance and direction to target borehole 300 provided by downhole tool 202, such as azimuthal/direction imaging tools described above, a relative distance in the horizontal plane between target borehole 300 and intercept borehole 308 and reference borehole(s) 306 may be solved for. Additionally, Scale factors may be derived by utilizing the calculated relative distances to target borehole 300 from each intercept borehole 308 and reference borehole(s) 306.

Figure 3:
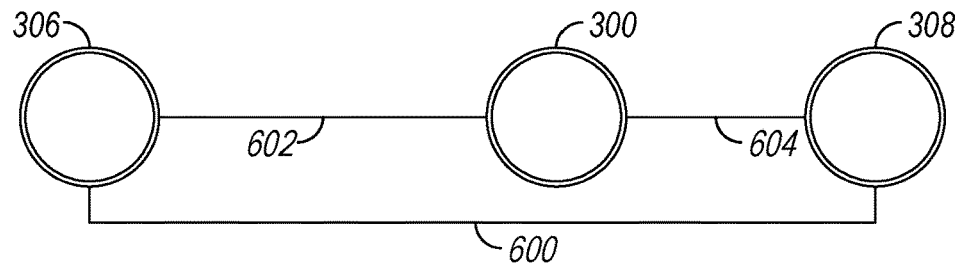
FIGS. 3-5 illustrate different examples of ranging operations.

FIG. 3 illustrates an example of determining target borehole 300 in space from reference borehole 306 and intercept borehole 308. As illustrates, distance and direction from intercept borehole 308 and reference borehole 306 is identified by line 600. Distance and direction for line 600 may be found utilizing active or passive ranging techniques described above utilizing ranging processes. Direction, for line 602, from reference borehole 306 to target borehole 300 is identified by line 602. Direction may be measured using an azimuthal imaging tool disposed in reference borehole 306. Additionally, direction from intercept borehole 308 to target wellbore 300 is identified by line 604. Direction, for line 604, from intercept borehole 308 to target borehole 300 may be found utilizing an azimuthal imaging tool disposed within intercept borehole 308. From intercept borehole 308 to target borehole 300 and reference borehole 306 to target borehole 300, target borehole 300 may appear to either be closer, further, or of the same distance from two relative positions (i.e., along lines 602, 604). In 2-dimensional linear form, a distance from intercept borehole 308 to target borehole 300 and points reference borehole 306 to target borehole 300 may be derived utilizing the measured difference in which the azimuthal imaging tool identified target borehole 300 and the known distance from intercept borehole 308 to target borehole 300 which are provided from the magnetic ranging determination.

Figure 4:
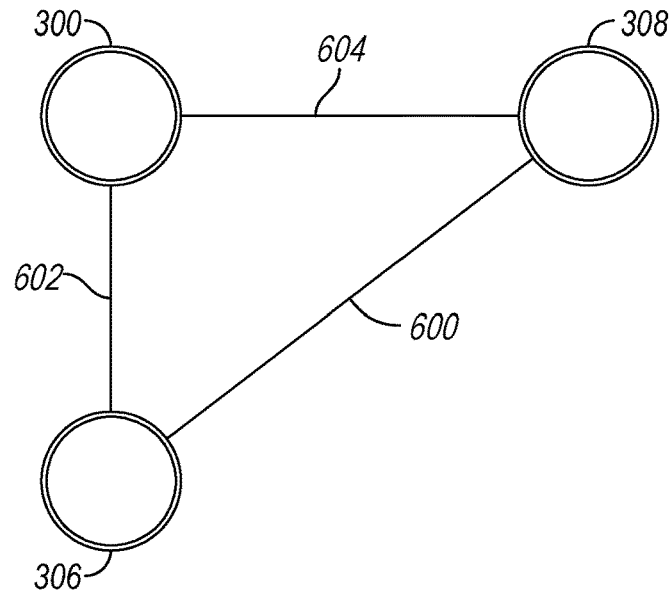
Figure 5:
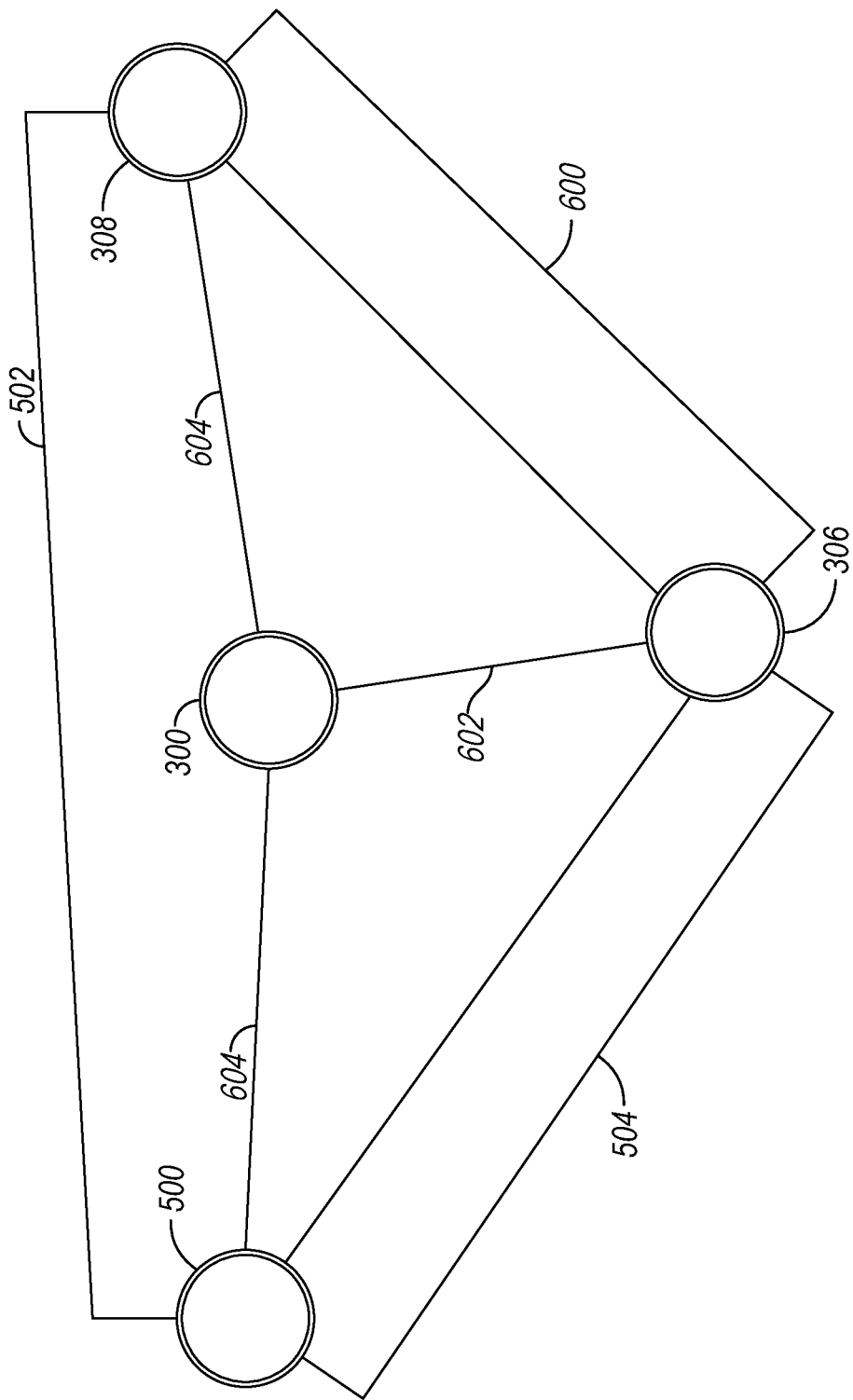

FIG. 4 illustrates another example for finding target borehole 300 from reference borehole 306 and intercept borehole 308. From points intercept borehole 308 to target wellbore 300 and reference borehole 306 to target borehole 300 the imaged target borehole 300 may appear to either be closer, further or of the same distance from two relative positions. In a 2-dimensional nonlinear form, a distance along line 604 and line 602 may be derived utilizing trigonometry in conjunction with the measured difference in which the azimuthal imaging tool identifies target borehole 300 and the known distance, along line 600, intercept borehole 300 to reference borehole 306, which may be provided from the magnetic ranging determination FIG. 5 illustrates another example for finding target borehole 300 from reference borehole 306, intercept borehole 308, and a secondary reference borehole 500. If more than one secondary reference borehole 500 is utilized than at least a part of the secondary reference boreholes 500 would be magnetically ranged to one another along with the intercept borehole 306. Thus, intercept borehole 308 to reference borehole 306 (i.e., line 600), intercept borehole 308 to secondary reference borehole 500 (i.e., line 502), and reference borehole 306 to secondary reference borehole 500 (i.e., line 504) may have magnetic ranging determination operations performed to providing a distance and direction. This in addition distance along line 604 and line 602, which are found using the methods and systems described above. This may allow for more complex and precise triangulation calculations to be made in determining the position of the wellbore and a scale factor to be used for the azimuthal imaging tool.

In examples, described above, determining location of target borehole 300 may utilizing linear algebraic formulas to produce a "best fit" of the relative position in space that target borehole 300 may be located. The inputs into the liner algebraic formulas may provide for scale factor "calibration" of the azimuthal imaging tool and the magnetic ranging determinations between intercept borehole 308 and reference borehole 306.

The methods and systems discussed above are improvements over current technology. Improvements over current technology may be seen in the operation that combines an azimuthal imaging ability to see the direction of an anomaly different to the formation (whether that be resistance, acoustic etc.), the utilization of triangulation, combined with the accuracy of magnetic ranging to determine a highly accurate relative distance between at least two objects. This process may allow for determining the position of a wellbore that may be unseen by an electromagnetic downhole tool. This may happen during operations in which independent active magnetic ranging systems are unable to create an electromagnetic field on the target well casing due to high resistant formations or casing strings that have significant damage disrupting electrical continuity. Disruption in electrical continuity may impact the ability to generate an electromagnetic field with AC current from the independent active magnetic ranging system.

Systems and methods for ranging and imaging may include any of the various features disclosed herein, including one or more of the following statements.

Statement 1: A method may comprise disposing a bottom hole assembly into an intercept borehole, wherein the bottom hole assembly (BHA) comprises an imaging tool and a ranging tool, disposing a downhole tool into a reference borehole, wherein the downhole tool comprises a second imaging tool and a second ranging tool, imaging a target borehole with the imaging tool to form a first image, and imaging the target borehole with the second imaging tool to form a second image. The method may further comprise identifying a distance and a direction between the intercept borehole and the reference borehole using the ranging tool and the second ranging tool, and combining the first image, the second image, the distance, and the direction to find a second direction and a second distance to the target borehole from the intercept borehole.

Statement 2: The method of statement 1, further comprising applying a scale factor to the second direction and the second distance.

Statement 3: The method of statements 1 or 2, further comprising penetrating the target borehole with the intercept borehole using the BHA.

Statement 4: The method of any preceding statements 1-3, wherein the imaging tool and the second imaging tool is an acoustic imaging tool.

Statement 5: The method of any preceding statements 1-4, wherein the imaging tool and the second imaging tool is a resistivity imaging tool.

Statement 6: The method of any preceding statements 1-5, wherein the ranging tool and the second imaging tool are an electromagnetic ranging tool.

Statement 7: The method of any preceding statements 1-6, wherein the ranging tool and the second imaging tool are an acoustic ranging tool.

Statement 8: The method of any preceding statements 1-7, wherein the ranging tool and the second imaging tool are a resistivity ranging tool.

Statement 9: The method of any preceding statements 1-8, wherein the reference borehole is formed from a drilling operation.

Statement 10. The method of any preceding statements 1-9, wherein the reference borehole is attached to and formed from the target borehole.

Statement 11. A non-transitory computer readable medium having data stored therein representing a software executable by a computer, the software executable including instructions comprising instructions to accept one or more images from an imaging tool or a second imaging tool, instructions to accept one or more ranging measurements form a ranging tool or a second ranging tool, and instructions to identify a distance and a direction between a target borehole and an intercept borehole using the one or more images and the one or more ranging measurements.

Statement 12. The non-transitory computer readable medium of statement 11, wherein the instruction further comprises instructions to apply a scale factor the distance and the direction.

Statement 13. The non-transitory computer readable medium of statements 11 or 12, wherein the imaging tool and the ranging tool are disposed on a bottom hole assembly (BHA).

Statement 14. The non-transitory computer readable medium of any previous statements 11-13, wherein the imaging tool and the ranging tool are disposed on a downhole tool.

Statement 15. The non-transitory computer readable medium of any previous statements 11-14, wherein the imaging tool is a resistivity imaging tool.

Statement 16. The non-transitory computer readable medium of any previous statements 11-15, wherein the imaging tool is an acoustic imaging tool.

Statement 17. The non-transitory computer readable medium of any previous statements 11-16, wherein the ranging tool is an electromagnetic ranging tool.

Statement 18. The non-transitory computer readable medium of any previous statements 11-17, wherein the ranging tool is an acoustic ranging tool.

Statement 19. The non-transitory computer readable medium of any previous statements 11-18, wherein the ranging tool is a resistivity ranging tool.

Statement 20. The non-transitory computer readable medium of any previous statements 11-19, further comprises sending instructions to guide a bottom hole assembly (BHA) in an intercept borehole to penetrate a target borehole based at least in part on the distance and the direction.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    disposing a bottom hole assembly into an intercept borehole, wherein the bottom hole assembly (BHA) comprises an imaging tool and a ranging tool;
    disposing a downhole tool into a reference borehole, wherein the downhole tool comprises a second imaging tool and a second ranging tool;
    imaging a target borehole with the imaging tool to form a first image;
    imaging the target borehole with the second imaging tool to form a second image;
    identifying a distance and a direction between the intercept borehole and the reference borehole using the ranging tool and the second ranging tool; and
    combining the first image, the second image, the distance, and the direction to find a second direction and a second distance to the target borehole from the intercept borehole.

2. The method of claim 1, further comprising applying a scale factor to the second direction and the second distance.

3. The method of claim 1, further comprising penetrating the target borehole with the intercept borehole using the BHA.

4. The method of claim 1, wherein the imaging tool and the second imaging tool is an acoustic imaging tool.

5. The method of claim 1, wherein the imaging tool and the second imaging tool is a resistivity imaging tool.

6. The method of claim 1, wherein the ranging tool and the second imaging tool are an electromagnetic ranging tool.

7. The method of claim 1, wherein the ranging tool and the second imaging tool are an acoustic ranging tool.

8. The method of claim 1, wherein the ranging tool and the second imaging tool are a resistivity ranging tool.

9. The method of claim 1, wherein the reference borehole is formed from a drilling operation.

10. The method of claim 1, wherein the reference borehole is attached to and formed from the target borehole.

11. A non-transitory computer readable medium having data stored therein representing a software executable by a computer, the software executable including instructions comprising:
    instructions to accept one or more images from an imaging tool or a second imaging tool;
    instructions to accept one or more ranging measurements from a ranging tool or a second ranging tool;
    instructions to form a first image from the one or more images from the imaging tool;
    instructions to form a second image from the one or more mages from the second imaging tool;
    instructions to identify a distance and a direction between a target borehole and an intercept borehole using the one or more ranging measurements; and
    instructions to combine the first image, the second image, the distance, and the direction to find a second direction and a second distance to the target borehole from the intercept borehole.

12. The non-transitory computer readable medium of claim 11, wherein the instruction further comprises instructions to apply a scale factor to the distance and the direction.

13. The non-transitory computer readable medium of claim 11, wherein the imaging tool and the ranging tool are disposed on a bottom hole assembly (BHA).

14. The non-transitory computer readable medium of claim 11, wherein the imaging tool and the ranging tool are disposed on a downhole tool.

15. The non-transitory computer readable medium of claim 11, wherein the imaging tool is a resistivity imaging tool.

16. The non-transitory computer readable medium of claim 11, wherein the imaging tool is an acoustic imaging tool.

17. The non-transitory computer readable medium of claim 11, wherein the ranging tool is an electromagnetic ranging tool.

18. The non-transitory computer readable medium of claim 11, wherein the ranging tool is an acoustic ranging tool.

19. The non-transitory computer readable medium of claim 11, wherein the ranging tool is a resistivity ranging tool.

20. The non-transitory computer readable medium of claim 11, further comprises sending instructions to guide a bottom hole assembly (BHA) in an intercept borehole to penetrate a target borehole based at least in part on the distance and the direction.

* * * * *